(12) United States Patent
Zhang

(10) Patent No.: US 12,395,639 B2
(45) Date of Patent: Aug. 19, 2025

(54) BLOCKING ARTIFACT DETECTION

(71) Applicant: BEIJING BAIDU NETCOM SCIENCE TECHNOLOGY CO., LTD., Beijing (CN)

(72) Inventor: Xu Zhang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/747,765

(22) Filed: Jun. 19, 2024

(65) Prior Publication Data
US 2024/0422325 A1    Dec. 19, 2024

(30) Foreign Application Priority Data
Mar. 20, 2024   (CN) .......................... 202410323985.5

(51) Int. Cl.
*H04N 19/14*   (2014.01)
*H04N 19/105*  (2014.01)
*H04N 19/169*  (2014.01)
*H04N 19/182*  (2014.01)

(52) U.S. Cl.
CPC .......... *H04N 19/14* (2014.11); *H04N 19/105* (2014.11); *H04N 19/182* (2014.11); *H04N 19/1883* (2014.11)

(58) Field of Classification Search
CPC .... H04N 19/105; H04N 19/124; H04N 19/14; H04N 19/176; H04N 19/182; H04N 19/1883; H04N 19/86; H04N 19/865; H04N 19/80; H04N 19/82; H04N 19/895; H04N 19/635; H04N 19/615; H04N 19/619

USPC ............................................ 375/240–240.29
See application file for complete search history.

(56) References Cited

U.S. PATENT DOCUMENTS

| | | | |
|---|---|---|---|
| 2009/0034622 A1* | 2/2009 | Huchet ................ | H04N 19/182 375/E7.193 |
| 2011/0123121 A1* | 5/2011 | Springer .............. | H04N 19/117 382/199 |
| 2012/0287994 A1* | 11/2012 | Van der Auwera .. | H04N 19/176 375/E7.243 |
| 2013/0022107 A1* | 1/2013 | Van der Auwera .. | H04N 19/157 375/240.03 |
| 2018/0176564 A1* | 6/2018 | Panusopone ......... | H04N 19/124 |

* cited by examiner

*Primary Examiner* — Nathnael Aynalem
(74) *Attorney, Agent, or Firm* — Leydig, Voit & Mayer, Ltd.

(57) ABSTRACT

A blocking artifact detection method is provided. The method, which is applied to a video encoder, includes: detecting, based on a sum of pixel differences between each coding unit in a current coding tree unit and its adjacent coding unit, whether the coding unit and the adjacent coding unit meet an edge detection condition; in response to determining that a coding unit and its adjacent coding unit meet the edge detection condition, determining, based on information about the coding unit, image regions of an original image corresponding to the coding unit and the adjacent coding unit; detecting whether the image regions meet the edge detection condition; and determining, in response to determining that the image regions do not meet the edge detection condition, that there is a blocking artifact between the coding unit and the adjacent coding unit. This implementation improves the accuracy of blocking artifact detection.

20 Claims, 4 Drawing Sheets

100

Detect, based on a sum of pixel differences between each coding unit in a current coding tree unit and an adjacent coding unit, whether the coding unit and the adjacent coding unit meet an edge detection condition — 101

↓

In response to determining that the coding unit and the adjacent coding unit meet the edge detection condition, determine, based on information about the coding unit, image regions of an original image corresponding to the coding unit and the adjacent coding unit — 102

↓

Detect whether the image regions meet the edge detection condition — 103

↓

Determine, in response to determining that the image regions do not meet the edge detection condition, that there is a blocking artifact between the coding unit and the adjacent coding unit — 104

100

101 — Detect, based on a sum of pixel differences between each coding unit in a current coding tree unit and an adjacent coding unit, whether the coding unit and the adjacent coding unit meet an edge detection condition 102 — In response to determining that the coding unit and the adjacent coding unit meet the edge detection condition, determine, based on information about the coding unit, image regions of an original image corresponding to the coding unit and the adjacent coding unit 103 — Detect whether the image regions meet the edge detection condition 104 — Determine, in response to determining that the image regions do not meet the edge detection condition, that there is a blocking artifact between the coding unit and the adjacent coding unit

FIG. 1

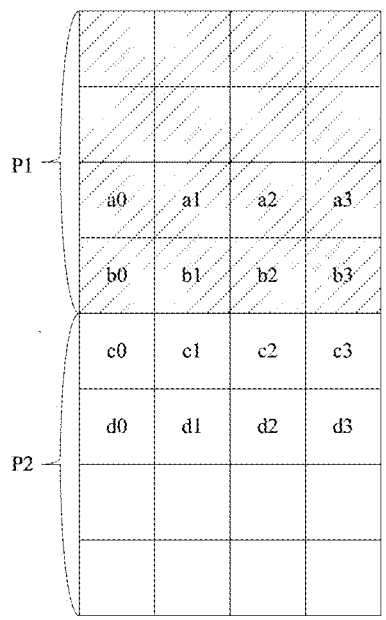

FIG. 2

BLOCKING ARTIFACT DETECTION

CROSS REFERENCE TO RELATED APPLICATIONS

This application claims priority to Chinese Patent Application No. 202410323985.5, filed on Mar. 20, 2024, the contents of which are hereby incorporated by reference in their entirety for all purposes.

TECHNICAL FIELD

The present disclosure relates to the technical field of image processing, specifically to the technical field of video coding and decoding, etc., and in particular to a blocking artifact detection method, an electronic device, a computer-readable medium.

BACKGROUND

In a video encoder, a blocking artifact is a phenomenon that there is an obvious difference between adjacent blocks of a video image due to the use of block-based coding and quantization for the video image.

In order to solve or reduce the blocking artifact, some of the existing blocking artifact detection methods are highly complex, and cannot be applied to all coding scenarios. Even if the blocking artifact can be detected by the existing blocking artifact detection methods, there is no good blocking artifact processing means.

SUMMARY

There are provided a blocking artifact detection method, an electronic device, a computer-readable storage medium.

According to one aspect of the present disclosure, a blocking artifact detection method is provided, and the method is applied to a video encoder, the method comprising: detecting, for each coding unit in a current coding tree unit, whether the coding unit and the adjacent coding unit meet an edge detection condition, based on a sum of pixel differences between each pixel pair in two adjacent rows or two adjacent columns, wherein one pixel of the pixel pair is in the coding unit and another pixel of the pixel pair is in the adjacent coding unit: in response to determining that a coding unit and its adjacent coding unit meet the edge detection condition, determining, based on information about the coding unit, image regions of an original image corresponding to the coding unit and the adjacent coding unit: detecting whether the image regions meet the edge detection condition; and determining, in response to determining that the image regions do not meet the edge detection condition, that there is a blocking artifact between the coding unit and the adjacent coding unit.

According to one aspect of the present disclosure, an electronic device is provided, the electronic device comprising: at least one processor; and a memory communicatively connected to the at least one processor, wherein the memory storing one or more programs configured to be executed by the one or more processors, the one or more programs including instructions for: detecting, for each coding unit in a current coding tree unit, whether the coding unit and its adjacent coding unit meet an edge detection condition, based on a sum of pixel differences between each pixel pair in two adjacent rows or two adjacent columns, wherein one pixel of the pixel pair is in the coding unit and another pixel of the pixel pair is in the adjacent coding unit: in response to determining that a coding unit and its adjacent coding unit meet the edge detection condition, determining, based on information about the coding unit, image regions of an original image corresponding to the coding unit and the adjacent coding unit; detecting whether the image regions meet the edge detection condition; and determining, in response to determining that the image regions do not meet the edge detection condition, that there is a blocking artifact between the coding unit and the adjacent coding unit.

According to one aspect of the present disclosure, a non-transitory computer-readable storage medium storing computer instructions is provided, wherein the computer instructions are used to cause a computer to perform following actions: detecting, for each coding unit in a current coding tree unit, whether the coding unit and its adjacent coding unit meet an edge detection condition, based on a sum of pixel differences between each pixel pair in two adjacent rows or two adjacent columns, wherein one pixel of the pixel pair is in the coding unit and another pixel of the pixel pair is in the adjacent coding unit: in response to determining that a coding unit and its adjacent coding unit meet the edge detection condition, determining, based on information about the coding unit, image regions of an original image corresponding to the coding unit and the adjacent coding unit: detecting whether the image regions meet the edge detection condition; and determining, in response to determining that the image regions do not meet the edge detection condition, that there is a blocking artifact between the coding unit and the adjacent coding unit.

According to the blocking artifact detection method and apparatus provided in the embodiments of the present disclosure, first, it is detected, whether the coding unit and its adjacent coding unit meet the edge detection condition, based on the sum of pixel differences between each pixel pair in two adjacent rows or two adjacent columns, wherein one pixel of the pixel pair is in the coding unit and another pixel of the pixel pair is in the adjacent coding unit: then, in response to determining that the coding unit and the adjacent coding unit meet the edge detection condition, the image regions of an original image corresponding to the coding unit and the adjacent coding unit are determined based on the information about the coding unit: next, it is detected whether the image regions meet the edge detection condition; and finally, it is determined, in response to the image regions failing to meet the edge detection condition, that there is a blocking artifact between the coding unit and the adjacent coding unit. In this way, edge detection is performed on the coding unit in the currently reconstructed coding tree unit, to determine whether a blocking artifact is generated in the coding unit. The blocking artifact detection is implemented at a detection level of a coding unit, which improves the reliability of the blocking artifact detection. After it is detected that the coding unit and the adjacent coding unit meet the edge detection condition, it is detected whether the image regions meet the edge detection condition, to determine whether there is a blocking artifact between the coding unit and the adjacent coding unit. The image regions of the original image are used as a reference for comparison, which improves the accuracy of blocking artifact detection.

It should be understood that the content described in this section is not intended to identify critical or important features of the embodiments of the present disclosure, and is not used to limit the scope of the present disclosure. Other features of the present disclosure will be readily understood with reference to the following description.

BRIEF DESCRIPTION OF THE DRAWINGS

The accompanying drawings are used for a better understanding of the solutions, and do not constitute a limitation on the present disclosure, in which:

FIG. 1 is a flowchart of an embodiment of a blocking artifact detection method according to the present disclosure;

FIG. 2 is a schematic diagram of a structure of pixel arrangement of coding units under an edge detection condition according to the present disclosure:

DETAILED DESCRIPTION

Figure 3:
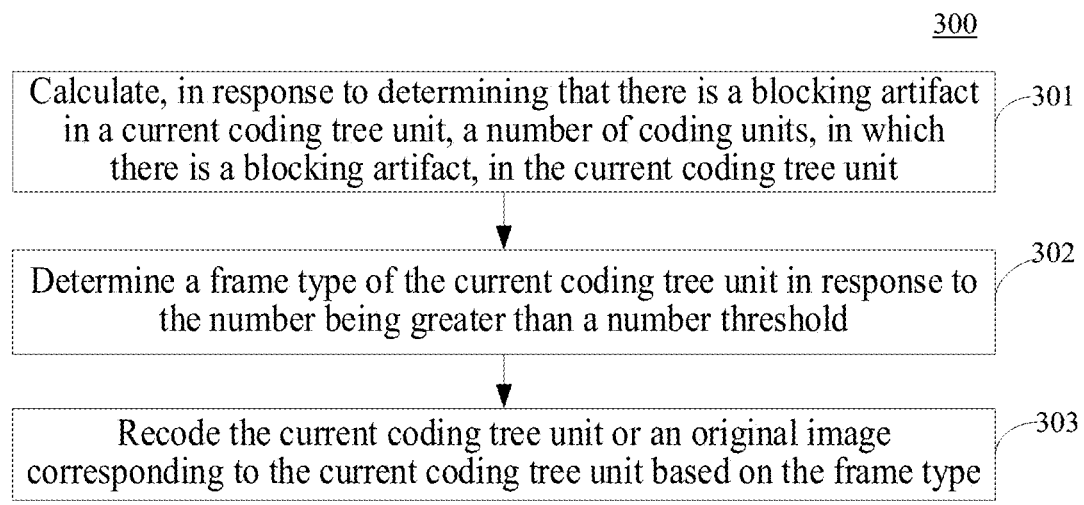
FIG. 3 is a flowchart of an embodiment of a blocking artifact processing method according to the present disclosure.

Exemplary embodiments of the present disclosure are described below in conjunction with the accompanying drawings, where various details of the embodiments of the present disclosure are included to facilitate understanding, and should only be considered as exemplary. Therefore, those of ordinary skill in the art should be aware that various changes and modifications can be made to the embodiments described herein, without departing from the scope and spirit of the present disclosure. Likewise, for clarity and conciseness, the description of well-known functions and structures is omitted in the following description.

In the embodiments, "first" and "second" are intended for descriptive purposes only and should not be construed as indicating or implying relative importance or implicitly indicating the number of technical features indicated. Thus, features defined with "first" and "second" may explicitly or implicitly include at least one of the features.

The Joint Collaborative Team on Video Coding has finalized a new video coding standard called high efficiency video coding (referred to as HEVC hereafter) over six years. With the same subjective image quality, the HEVC can reduce the bit rate by 50% compared with H.264/advanced video coding (AVC). The HEVC standard doubles the coding efficiency of H.264/AVC by using a variety of new compression means (including a complex coding block structure, a new spatial prediction direction and intra-frame coding, a complex interpolation filter, a new in-loop filter, and a new entropy coding scheme).

The HEVC differs from previous video coding standards basically in that the HEVC uses a quad-tree structure, which is a flexible mechanism that may segment an image into blocks of different sizes, for both prediction and residual coding. A basic processing unit in the HEVC is a coding tree unit (CTU), which may be considered as a generalization for a macro block in the H.264/AVC, and may be recursively subdivided into smaller coding units (CU) based on the quad-tree structure. Each coding unit is further subdivided into prediction units (PU) for internal use or internal prediction. After a prediction residual is generated, a transform is applied to the HEVC by using a nested residual quad-tree (RQT) for each coding unit, that is, dividing each coding unit into transform units (TU).

A blocking artifact is primarily a phenomenon that there is an obvious difference between adjacent blocks of a video image due to the use of block-based coding and quantization for the video image, which presents discontinuities at boundaries of small blocks that are perceived by human eyes in video coding. There are two causes for the generation of the blocking artifact. First, a block-based discrete cosine transform (DCT) is performed on residuals during coding, which ignores the correlation between blocks. Second, quantization of DCT coefficients is performed with different processing for different image blocks. During video coding, in order to solve or reduce the blocking artifact, many video coding standards (H264, H265, and SVAC) use deblocking filtering and pixel adaptive offset schemes. However, during HEVC coding, although the deblocking filtering and pixel adaptive offset techniques are used, it is very likely to lead to the blocking artifact due to factors such as scenario complexity and bit rate limitations, and once the blocking artifact is generated, the subjective experience is seriously affected.

In the conventional technologies, some blocking artifact detection methods are highly complex and cannot be applied to all coding scenarios, such as live streaming and communication modes which require a high coding speed. In addition, blocking artifact detection is performed only on an encoded image without involving comparison with an original image, which ignores the impact of the original image. Moreover, after the blocking artifact is detected, there is no good processing means for such a series of problems.

Aiming at the problem of a poor subjective experience in the conventional technologies, the present disclosure provides a blocking artifact detection method applied to a video encoder, where the encoder may be an encoder using the HEVC. FIG. 1 shows a process 100 of an embodiment of a blocking artifact detection method according to the present disclosure. The blocking artifact detection method includes the following steps.

Step 101: Detect, based on a sum of pixel differences between each coding unit in a current coding tree unit and an adjacent coding unit, whether the coding unit and the adjacent coding unit meet an edge detection condition.

In this embodiment, the current coding tree unit is a coding tree unit to be processed after an original image is divided into coding tree units. A precondition for performing blocking artifact detection on the current coding tree unit is that encoding of a coding tree unit adjacent to and above the current coding tree unit and a coding tree unit on the left of the current coding tree unit in a pixel row direction has been completed.

It should be noted that each coding unit in the current coding tree unit is a coding unit belonging to the current coding tree unit, while the adjacent coding unit may be a coding unit in the current coding tree unit, or may be a coding unit in a coding tree unit adjacent to the current coding tree unit, where the coding tree unit adjacent to the current coding tree unit may be a coding tree unit above the current coding tree unit or a coding tree unit on the left of the current coding tree unit in the pixel row direction.

In this embodiment, since a reference block in space domain needs to be used in the HEVC, a precondition for starting to encode the current coding tree unit is that encoding of the coding tree units above and on the left of the current coding tree unit in the pixel row direction has been completed, which is marked with an identifier. For example, if the encoding has been completed, the identifier is set to 1: or if the encoding has not been completed, the identifier is set to 0.

In this embodiment, the sum of pixel differences between each coding unit and the adjacent coding unit is a sum of pixel differences between pixel pairs in adjacent pixel rows or adjacent pixel columns between each coding unit and its adjacent coding unit. The pixel row is a row formed by adjacent pixels of each coding unit and the adjacent coding unit in the pixel row direction. As shown in FIG. 2, a row corresponding to c0, c1, c2, and c3 is a pixel row adjacent to b0, b1, b2, and b3. The pixel column is a column formed by adjacent pixels of each coding unit and the adjacent coding unit in a pixel column direction.

Step 102: In response to determining that the coding unit and the adjacent coding unit meet the edge detection condition, determine, based on information about the coding unit, image regions of an original image corresponding to the coding unit and the adjacent coding unit.

In this embodiment, the edge detection condition is a condition for detecting whether there is an edge between pixel rows or pixel columns (pixel rows or pixel columns of the coding units in the coding tree unit, or pixel rows or pixel columns in a region of the original image), and if there is an edge, it is determined that the edge detection condition is met: or if there is no edge, it is determined that the edge detection condition is not met.

In this embodiment, edge detection is performed on reconstructed images of the current coding tree unit, the coding tree unit on the left of the current coding tree unit, and the coding tree unit above the current coding tree unit, by traversing each coding unit in the current coding tree unit in an internal loop. If an edge is detected, it is considered that there may be a blocking artifact between two coding units (since there generally appears to be a relatively obvious boundary between two coding units when a blocking artifact is generated).

In this embodiment, the information about the coding unit is specification information, for example, location information and size information, of the coding unit. Specifically, the information about the coding unit includes: location coordinates of the coding unit and a size of the coding unit. Based on the information about the coding unit in the current coding tree unit, information about the adjacent coding unit may be obtained. Based on the information about the coding unit in the current coding tree unit and the information about the adjacent coding unit, the image regions of the original image corresponding to the coding unit and the adjacent coding unit may be obtained.

In this embodiment, the original image is an original image which is divided according to a quad-tree structure, and the image regions of the original are obtained by cutting out images of regions corresponding to the coding unit and the adjacent coding unit in the original image.

Step 103: Detect whether the image regions meet the edge detection condition.

In this embodiment, in order to eliminate some obvious edges that are already present in the original image, edge detection is performed on the original image, and if an edge is also detected on the original image, it cannot be determined whether there is a blocking artifact, otherwise, it is determined that there is a blocking artifact.

Step 104: Determine, in response to determining that the image regions do not meet the edge detection condition, that there is a blocking artifact between the coding unit and the adjacent coding unit.

In this embodiment, when it is determined that there may be a blocking artifact in the image regions of the original image by detecting that the coding unit and the adjacent coding unit meet the edge detection condition, detection may be performed on the original image at a corresponding location, and if the edge detection condition is met on the original image, it is not considered that there is a blocking artifact, or if there is no edge (that is, the edge detection condition is not met) on the original image, it is considered that there is a blocking artifact generated by encoding.

In this embodiment, the determining that there is a blocking artifact between the coding unit and the adjacent coding unit means that there is a blocking artifact in a coding tree unit to which the coding unit belongs, and there is also a blocking artifact in a coding tree unit to which the adjacent coding unit belongs, where the coding tree unit to which the coding unit belongs and the coding tree unit to which the adjacent coding unit belongs may be a same coding tree unit, or may be different coding tree units.

In this embodiment, for a video encoder without a deblocking filtering function, the blocking artifact detection method according to the present disclosure may be applied before encoding of the current coding tree unit is completed.

Optionally, for a video encoder with a deblocking filtering function, since the video encoder needs to perform deblocking filtering after entire-row encoding is completed during an HEVC coding process, in which case recoding a coding tree unit is costly, the impact of deblocking filtering on blocking artifact detection needs to be considered. Therefore, the blocking artifact detection needs to be performed before encoding of the current coding tree unit is completed and deblocking filtering is performed. Due to an apparent edge smoothing effect for luminance and an unapparent edge smoothing effect for chrominance, during final determination as to whether a blocking artifact is generated based on the pixel differences, only chrominance values of pixels may be considered without having to consider luminance values. In addition, deblocking filtering has a great impact on a blocking artifact in luminance, and the blocking artifact may disappear after the deblocking filtering: however, when the detection is performed with chrominance, the deblocking filtering has little impact on a blocking artifact in chrominance.

According to the blocking artifact detection method provided in the embodiment of the present disclosure, first, it is detected, based on the sum of the pixel differences between each coding unit in the current coding tree unit and the adjacent coding unit, whether the coding unit and the adjacent coding unit meet the edge detection condition: then, in response to determining that the coding unit and the adjacent coding unit meet the edge detection condition, the image regions of an original image corresponding to the coding unit and the adjacent coding unit are determined based on the information about the coding unit: next, it is detected whether the image regions meet the edge detection condition; and finally, it is determined, in response to the image regions failing to meet the edge detection condition, that there is a blocking artifact between the coding unit and the adjacent coding unit. In this way, edge detection is performed on the coding unit in the currently reconstructed coding tree unit, to determine whether a blocking artifact is generated in the coding unit. The blocking artifact detection is implemented at a detection level of a coding unit, which improves the reliability of the blocking artifact detection. After it is detected that the coding unit and the adjacent coding unit meet the edge detection condition, it is detected whether the image regions meet the edge detection condition, to determine whether there is a blocking artifact between the coding unit and the adjacent coding unit. The image regions of the original image are used as a reference for comparison, which improves the accuracy of blocking artifact detection.

In some embodiments of the present disclosure, the blocking artifact detection method further includes: determining, in response to determining that the coding unit and the adjacent coding unit do not meet the edge detection condition, that there is no blocking artifact between the coding unit and the adjacent coding unit.

According to the blocking artifact detection method provided in the present disclosure, when it is detected that the coding unit and the adjacent coding unit do not meet the edge detection condition, it is determined that there is no blocking artifact between the coding unit and the adjacent coding unit. Determining, based on the edge detection condition, that there is no blocking artifact between the coding unit and the adjacent coding unit provides a reliable implementation for filtering of the blocking artifact.

In some embodiments of the present disclosure, the blocking artifact detection method further includes: determining, in response to determining that the image regions meet the edge detection condition, that there is no blocking artifact between the coding unit and the adjacent coding unit.

According to the blocking artifact detection method provided in this embodiment, when it is detected that the image regions meet the edge detection condition, it is determined that there is actually an edge between the coding unit and the adjacent coding unit in the original image, in which case it cannot be determined that there is a blocking artifact between the coding unit and the adjacent coding unit. Therefore, determining that there is no blocking artifact between the coding unit and the adjacent coding unit when the image regions meet the edge detection condition provides another reliable implementation for filtering of the blocking artifact.

In some optional implementations of the present disclosure, the sum of pixel differences is a sum of pixel differences in the pixel row direction, and the edge detection condition includes: the sum of pixel differences being greater than a sum of differences between adjacent rows, and the sum of pixel differences being greater than a sum of differences between internal rows.

In this optional implementation, the sum of differences between adjacent rows is a sum of pixel differences between any two adjacent rows in the pixel row direction in the adjacent coding unit or the image region corresponding to that adjacent coding unit; and the sum of differences between internal rows is a sum of pixel differences between any two adjacent rows in the pixel row direction in each coding unit or the image region corresponding to that coding unit.

In this optional implementation, only when pixels in each coding unit and the adjacent coding unit are arranged in the pixel row direction, the edge detection condition of the sum of pixel differences being greater than the sum of differences between adjacent rows, and the sum of pixel differences being greater than the sum of differences between internal rows is used.

The edge detection condition provided in this optional implementation is set as the sum of pixel differences being greater than both the sum of differences between adjacent rows and the sum of differences between internal rows, which provides a reliable implementation for fulfillment of the edge detection condition.

Optionally, the edge detection condition includes: a strong edge sub-condition and a weak edge sub-condition. The strong edge sub-condition is that a difference between the sum of pixel differences and the sum of differences between adjacent rows is greater than a first threshold, and a difference between the sum of pixel differences and the sum of differences between internal rows is greater than the first threshold. The weak edge sub-condition is that a difference between the sum of pixel differences and the sum of differences between adjacent rows is greater than a second threshold, and a difference between the sum of pixel differences and the sum of differences between internal rows is greater than the second threshold. The second threshold is less than the first threshold, and the first threshold and the second threshold are both greater than zero.

In this embodiment, coding units in the current coding tree unit are checked one by one, to detect whether there is a strong or weak edge between the current coding tree unit and the coding tree unit thereabove and between the current coding tree unit and the coding tree unit on the left thereof in the pixel row direction (if pixel differences at a boundary are greater than adjacent pixel differences by a large quantity, it is considered that there is a strong edge: or if pixel differences at a boundary are greater than adjacent pixel differences by a small quantity, it is considered that there is a weak edge).

For example, a sum of pixel differences between edges of a coding unit in the current coding tree unit and a coding unit in the coding tree unit above the current coding tree unit is calculated, and if the difference between the sum of pixel differences and the sum of differences between internal rows is greater than the first threshold, it is determined that the strong edge sub-condition is met: or if the difference between the sum of pixel differences and the sum of differences between internal rows is greater than the second threshold, it is determined that the weak edge sub-condition is met.

In this embodiment, if one of the coding unit and the adjacent coding unit meets the strong edge sub-condition, it is determined that there is a blocking artifact: or if both the coding unit and the adjacent coding unit meet the weak edge sub-condition, it is determined that there is a blocking artifact: otherwise, it is determined that there is no blocking artifact.

Optionally, the edge detection condition includes: the sum of pixel differences being greater than a first sum of differences between adjacent rows, and the sum of pixel differences being greater than a first sum of differences between internal rows. The first sum of differences between adjacent rows is a sum of pixel differences between a first pixel row and a second pixel row in the pixel row direction in the adjacent coding unit, where the first pixel row is a pixel row in the adjacent coding unit that is closest to each coding unit, and the second pixel row is a pixel row that is on the side away from each coding unit and is closest to the first pixel row. The first sum of differences between internal rows is a sum of pixel differences between a third pixel row and a fourth pixel row in the pixel row direction in each coding unit, where the third pixel row is a pixel row in each coding unit that is closest to the adjacent coding unit, and the fourth pixel row is a pixel row that is on the side away from the adjacent coding unit and is closest to the third pixel row. Specifically, as shown in FIG. 2, P1 is a coding unit, and P2 is an adjacent coding unit adjacent to P1 in the pixel row direction. The sum of pixel differences between P1 and P2 is abs (b0)–c0)+abs (b1–c1)+abs (b2-c2)+abs (b3–c3). The first pixel row is a row where pixels with pixel values of c0, c1, c2, and c3 are located, the second pixel row is a row where pixels with pixel values of d0, d1, d2, and d3 are located, and the first sum of differences between adjacent rows is abs (c0–d0)+abs (c1–d1)+abs (c2–d2)+abs (c3–d3). The third pixel row is a row where pixels with pixel values of b0, b1, b2, and b3 are located, the fourth pixel row is a row where pixels with pixel values of a0, a1, a2, and a3 are located, and the first sum of differences between internal rows is abs (a0)–b0)+abs (a1–b1)+abs (a2–b2)+abs (a3–b3).

In some optional implementations of the present disclosure, the sum of pixel differences is a sum of pixel differences in the pixel column direction, and the edge detection condition includes: the sum of pixel differences being greater than a sum of differences between adjacent columns, and the sum of pixel differences being greater than a sum of differences between internal columns.

In this embodiment, the sum of differences between adjacent columns is a sum of pixel differences between any two adjacent columns in the pixel column direction in the adjacent coding unit or the image region corresponding to that adjacent coding unit; and the sum of differences between internal columns is a sum of pixel differences between any two adjacent columns in the pixel column direction in each coding unit or the image region corresponding to that coding unit.

In this optional implementation, only when pixels in each coding unit and the adjacent coding unit are arranged in the pixel column direction, the edge detection condition of the sum of pixel differences being greater than the sum of differences between adjacent columns, and the sum of pixel differences being greater than the sum of differences between internal columns is used.

The edge detection condition provided in this optional implementation is set as the sum of pixel differences being greater than both the sum of differences between adjacent columns and the sum of differences between internal columns, which provides another reliable implementation for fulfillment of the edge detection condition.

Optionally, the edge detection condition includes: the sum of pixel differences being greater than a first sum of differences between adjacent columns, and the sum of pixel differences being greater than a first sum of differences between internal columns. The first sum of differences between adjacent columns is a sum of pixel differences between a first pixel column and a second pixel column in the pixel column direction in the adjacent coding unit, where the first pixel column is a pixel column in the adjacent coding unit that is closest to each coding unit, and the second pixel column is a pixel column that is on the side away from each coding unit and is closest to the first pixel column. The first sum of differences between internal columns is a sum of pixel differences between a third pixel column and a fourth pixel column in the pixel column direction in each coding unit, where the third pixel column is a pixel column in each coding unit that is closest to the adjacent coding unit, and the fourth pixel column is a pixel column that is on the side away from the adjacent coding unit and is closest to the third pixel column.

In order to eliminate a detected blocking artifact, the present disclosure further provides a blocking artifact processing method, where the blocking artifact processing method is applied to a video encoder. FIG. 3 shows a process 300 of an embodiment of a blocking artifact processing method according to the present disclosure. The blocking artifact processing method includes the following steps.

Step 301: Calculate, in response to determining that there is a blocking artifact in a current coding tree unit, a number of coding units, in which there is a blocking artifact, in the current coding tree unit.

In this embodiment, the coding unit in which there is a blocking artifact may be detected by the blocking artifact detection method provided in the above embodiment.

In this embodiment, coding units in the current coding tree unit are traversed, and detection is performed on each coding unit and an adjacent coding unit adjacent to the coding unit by using the blocking artifact detection method. If there is a blocking artifact between one coding unit and its adjacent coding unit, the number is increased by one until all the coding units in the current coding tree unit have been traversed, so that the number, which is used for representing the number of coding units in which there is a blocking artifact in the current coding tree unit, is obtained.

Step 302: Determine a frame type of the current coding tree unit in response to the number being greater than a number threshold.

In this embodiment, the number threshold may be determined based on requirements of reconstructing a coding tree unit. For example, the number threshold is 80% of the number of coding units in the coding tree unit, and when the number is greater than the number threshold, it is determined that there are too many coding units in which there is a blocking artifact in the coding tree unit, and the coding tree unit needs to be recoded.

Step 303: Recode the current coding tree unit or an original image corresponding to the current coding tree unit based on the frame type.

In this embodiment, step 303 includes: determining an importance value of the current coding tree unit based on the frame type; and recoding the original image corresponding to the current coding tree unit in response to the importance value of the current coding tree unit being greater than an importance threshold, where the original image corresponding to the current coding tree unit is an original image on which inter-frame or intra-frame block division has not been performed, and a region of the original image corresponds to the current coding tree unit.

Step 303 further includes: recoding the current coding tree unit in response to the importance value of the current coding tree unit being less than or equal to the importance threshold, where recoding the current coding tree unit means: retaining a structure and a mode of block structure division for the current coding tree unit, and recoding the current coding tree unit by adjusting a quantization parameter.

In this embodiment, recoding means performing, using the video encoder, bit stream encoding on a unit (for example, the coding tree unit or the coding unit) obtained after image or block structure division. In order to retain the structure of division of the unit obtained after the block structure division, some components for block structure division in the video encoder may be disabled.

According to the blocking artifact processing method provided in the embodiments of the present disclosure, first, in response to determining that there is a blocking artifact in the current coding tree unit, the number of coding units, in which there is a blocking artifact, in the current coding tree unit is calculated: then, the frame type of the current coding tree unit is determined in response to the number being greater than the number threshold; and finally, the current coding tree unit or the original image corresponding to the current coding tree unit is recoded based on the frame type. In this way, the coding unit in which there is a blocking artifact and the coding tree unit that needs to be recoded can be found more accurately, and the coding tree unit or the original image corresponding to the coding tree unit can be recoded in a timely manner, which can eliminate the blocking artifact in real time. Compared with entire-frame or entire-row recoding, recoding the current coding tree unit or the original image corresponding to the current coding tree unit reduces the cost of recoding, and the adverse impact of the blocking artifact, thereby comprehensively improving the subjective quality of coding.

In some embodiments of the present disclosure, the frame type includes: a key frame and a forward reference frame; and the recoding the current coding tree unit or an original image corresponding to the current coding tree unit based on the frame type includes: adjusting a quantization parameter of the video encoder in response to the frame type being the key frame or the forward reference frame, and recoding the original image corresponding to the current coding tree unit by using the video encoder with the quantization parameter adjusted.

In this optional implementation, the adjusting a quantization parameter of the video encoder includes: reducing a value of the quantization parameter. Since a lower quantization parameter is better, the quantization parameter needs to be lowered based on the generation of a blocking artifact, so as to ensure that the current coding tree unit is assigned a higher bit rate, more details are retained after encoding, and a probability of generating a blocking artifact is reduced.

In this optional implementation, the key frame is also referred to as an internal coding frame or an I frame, and the forward reference frame is also referred to as a forward prediction frame or a P frame. The P frame and the I frame employ a recoding mode in which the original image corresponding to the current coding tree unit is recoded by using the video encoder with the quantization parameter adjusted. Because this recoding mode is time-consuming but has a higher recoding quality, this recoding mode is used when there are fewer P frames and I frames and a higher coding quality is required.

In this optional implementation, the quantization parameter (QP) of the video encoder is an indicator for measuring the quality of the video encoder. A lower value set for the quantization parameter indicates a better coding quality of the video encoder.

According to the method for recoding the original image corresponding to the current coding tree unit provided in this optional implementation, when the frame type of the current coding tree unit is the key frame or the forward reference frame, the quantization parameter of the video encoder is adjusted, and the original image corresponding to the current coding tree unit is recoded by using the video encoder with the quantization parameter adjusted, so that the efficiency of blocking artifact processing is improved, and the reliability of blocking artifact processing based on the key frame and the forward reference frame is ensured.

In some optional implementations of the present disclosure, the frame type includes: a bidirectional reference frame; and the recoding the current coding tree unit or an original image corresponding to the coding tree unit based on the frame type includes: adjusting a quantization parameter of the video encoder in response to the frame type being the bidirectional reference frame; and disabling an intra-frame and inter-frame control component in the video encoder with the quantization parameter adjusted, and recoding the current coding tree unit by using the video encoder.

In this optional implementation, the intra-frame and inter-frame control component is a unit in the video encoder that divides coding tree units and coding units in the coding tree units of an image. Therefore, a structure and an optimal mode of division of the current coding tree unit can be retained by disabling the intra-frame and inter-frame control component. The optimal mode is a mode in which motion vectors of blocks are transmitted based on types. Different types of motion vectors carry different volumes of data. Depending on a number of coding units in the current coding tree unit, for example, in a case where the current coding tree unit includes one or more coding units, the optimal mode may be any one of an inter mode, a skip mode, and a merge mode. In the inter mode, a motion vector difference (MVD) between a matching block (obtained by a matching algorithm) and a currently encoded block (obtained by selecting a motion vector predicted in time domain or space domain) and a prediction error (because there is also an error between a predicted block and an actual original frame) are transmitted, and thus a larger volume of data is carried. In the merge mode, a motion vector is predicted by using the block currently being encoded, without a need to transmit the MVD (that is, no motion estimation is required), and only the prediction error exists. In the skip mode, a corresponding motion vector (a matching block calculated by the matching algorithm) pointing to a reference block is directly transmitted (which is equivalent to a block from a previous frame being directly translated to a next frame without making any change) without a need to transmit the MVD and a prediction residual.

In this optional implementation, the bidirectional reference frame is also referred to as a bidirectional interpolation frame or a B frame. The B frame has a fast coding speed and a lower coding quality than that of the P frame. The current coding tree unit is recoded after the intra-frame and inter-frame control component in the video encoder with the quantization parameter adjusted is disabled, so that the coding efficiency of the video encoder can be improved.

According to the method for recoding the current coding tree unit provided in this optional implementation, when the frame type of the current coding tree unit is the bidirectional reference frame, the quantization parameter of the video encoder is adjusted, the intra-frame and inter-frame control component in the video encoder with the quantization parameter adjusted is disabled, and the current coding tree unit is recoded by using the video encoder, so that the efficiency of blocking artifact processing is improved, and the reliability of blocking artifact processing based on the bidirectional reference frame is ensured.

Figure 4:
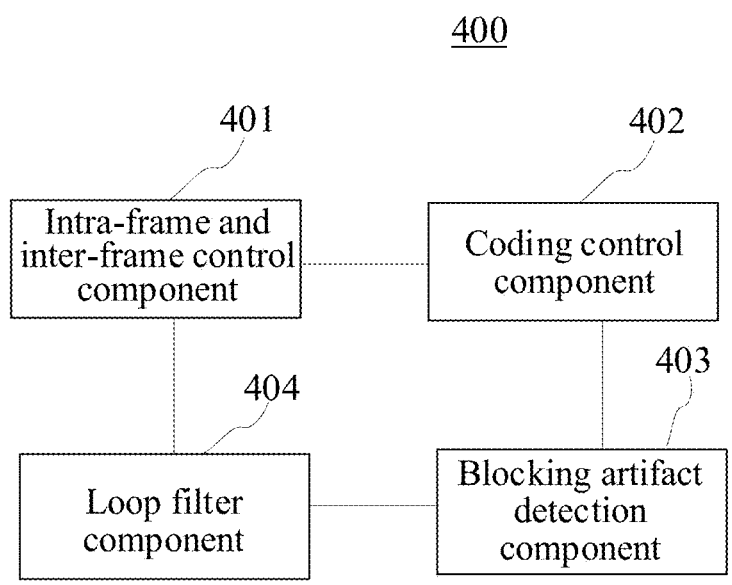
FIG. 4 is a schematic diagram of a structure of an embodiment of a video encoder according to the present disclosure.

Further with reference to FIG. 4, the present disclosure further provides a video encoder. The video encoder is used to receive an image (an original image corresponding to a plurality of coding tree units) and generate a bit stream. A blocking artifact detection component in the video encoder corresponds to the method embodiment shown in FIG. 1.

In some embodiments, a video encoder comprises: an intra-frame and inter-frame control component, a coding control component, a blocking artifact detection component, and a loop filter component that are sequentially connected, wherein the intra-frame and inter-frame control component is configured to perform intra-frame or inter-frame prediction on the original image, to obtain a predicted residual block corresponding to each of a plurality of coding tree units: the coding control component is configured to, for each of the plurality of coding tree units, perform a discrete cosine transform and quantization on the predicted residual block corresponding to that coding tree units, to obtain a quantized transform coefficient, and obtain a reconstructed coding tree unit based on the quantized transform coefficient and the predicted residual block: the blocking artifact detection component is configured to: detect, based on a sum of pixel differences between each coding unit in a current coding tree unit and an adjacent coding unit, whether the coding unit and the adjacent coding unit meet an edge detection condition: in response to determining that the coding unit and the adjacent coding unit meet the edge detection condition, determine, based on information about the coding unit, image regions of an original image corresponding to the coding unit and the adjacent coding unit: detect whether the image regions meet the edge detection condition; and determine, in response to the image regions failing to meet the edge detection condition, that there is a blocking artifact between the coding unit and the adjacent coding unit; and the loop filter component is configured to perform filtering on a current reconstructed coding tree unit that has passed through the blocking artifact detection component.

In some embodiments, the video encoder further comprises: a blocking artifact processing component, which is connected between the blocking artifact detection component and the loop filter component, and is configured to: calculate, in response to determining that there are one or more coding units with blocking artifact in the current coding tree unit, a number of coding units, in which there is a blocking artifact, in the current coding tree unit, determine a frame type of the current coding tree unit in response to the number being greater than a number threshold; and recode the current coding tree unit or the original image corresponding to the current coding tree unit based on the frame type.

As shown in FIG. 4, a blocking artifact detection apparatus 400 provided in this embodiment includes: an intra-frame and inter-frame control component 401, a coding control component 402, a blocking artifact detection component 403, and a loop filter component 404 that are sequentially connected. The intra-frame and inter-frame control component 401 is configured to perform intra-frame or inter-frame prediction on an image, to obtain a predicted residual block corresponding to each of a plurality of coding tree units. The coding control component 402 is configured to: perform a discrete cosine transform and quantization on the predicted residual block, to obtain a quantized transform coefficient; and obtain a reconstructed coding tree unit based on the quantized transform coefficient and the predicted residual block. The blocking artifact detection component 403 is configured to: detect, based on a sum of pixel differences between each coding unit in a current coding tree unit and an adjacent coding unit, whether the coding unit and the adjacent coding unit meet an edge detection condition: in response to determining that the coding unit and the adjacent coding unit meet the edge detection condition, determine, based on information about the coding unit, image regions of an original image corresponding to the coding unit and the adjacent coding unit: detect whether the image regions meet the edge detection condition; and determine, in response to the image regions failing to meet the edge detection condition, that there is a blocking artifact between the coding unit and the adjacent coding unit. The loop filter component 404 is configured to perform filtering on a currently reconstructed coding tree unit that has passed through the blocking artifact detection component.

In this embodiment, the intra-frame and inter-frame control component 401 divides the image into non-overlapping coding tree units with at least one coding unit reserved, performs predictive coding on the coding tree units by using spatial correlations and temporal correlations of a video, removes redundant information in space domain through intra-frame prediction and inter-frame prediction, to obtain predicted image blocks; and the intra-frame and inter-frame control component performs a subtraction operation on the predicted image blocks and original image blocks, to obtain the predicted residual blocks.

In this embodiment, the coding control component 402 is configured to: perform the discrete cosine transform and quantization on the predicted residual block, to obtain the quantized transform coefficient; and perform entropy encoding on the quantized transform coefficient, to obtain a compressed code stream, where the compressed code stream is a bit stream. The coding control component 402 further reconstructs the coding tree unit through an inverse transform and inverse quantization, to obtain the reconstructed coding tree unit.

In this embodiment, the blocking artifact detection component 403 is a component for implementing the above blocking artifact detection method. Operations, features, and resulting beneficial effects described above for the blocking artifact detection method are also applicable to the blocking artifact detection component 403, and details are not repeated herein.

In this embodiment, the loop filter component 404, as a module for implementing deblocking filtering in the HEVC, is configured to perform filtering on code in an entire row or frame of the image. In this case, if the entire-row or entire-frame recoding is performed, the cost of entire-row recoding is high. However, if some coding tree units that need to be recoded are detected by the blocking artifact detection component, and are then recoded separately, the coding cost of the video encoder can be reduced.

According to the video encoder provided in this embodiment, the blocking artifact detection component is used to perform edge detection on a coding unit in the current reconstructed coding tree unit, to determine whether a blocking artifact is generated in the coding unit. The blocking artifact detection is implemented at a detection level of a coding unit, which improves the reliability of the blocking artifact detection. After detecting that the coding unit and the adjacent coding unit meet the edge detection condition, the blocking artifact detection component detects whether the image regions meet the edge detection condition, to determine whether there is a blocking artifact between the coding unit and the adjacent coding unit. The image regions of the original image are used as a reference for comparison, which improves the accuracy of blocking artifact detection.

Optionally, the blocking artifact detection apparatus 400 may further include: a pixel adaptive offset component configured to perform an adaptive offset on pixels. The pixel adaptive offset component mainly performs a pixel-based offset on a reconstructed image, to reduce differences between the reconstructed image and the original image.

In another embodiment of the present disclosure, the video encoder further includes: a blocking artifact processing component, which is connected between the blocking artifact detection component and the loop filter component, and is configured to: calculate, when the blocking artifact detection component detects that there is a blocking artifact in the current coding tree unit, a number of coding units, in which there is a blocking artifact, in the current coding tree unit, determine a frame type of the current coding tree unit in response to the number being greater than a number threshold; and recode the current coding tree unit or an original image corresponding to the coding tree unit based on the frame type.

Figure 5:
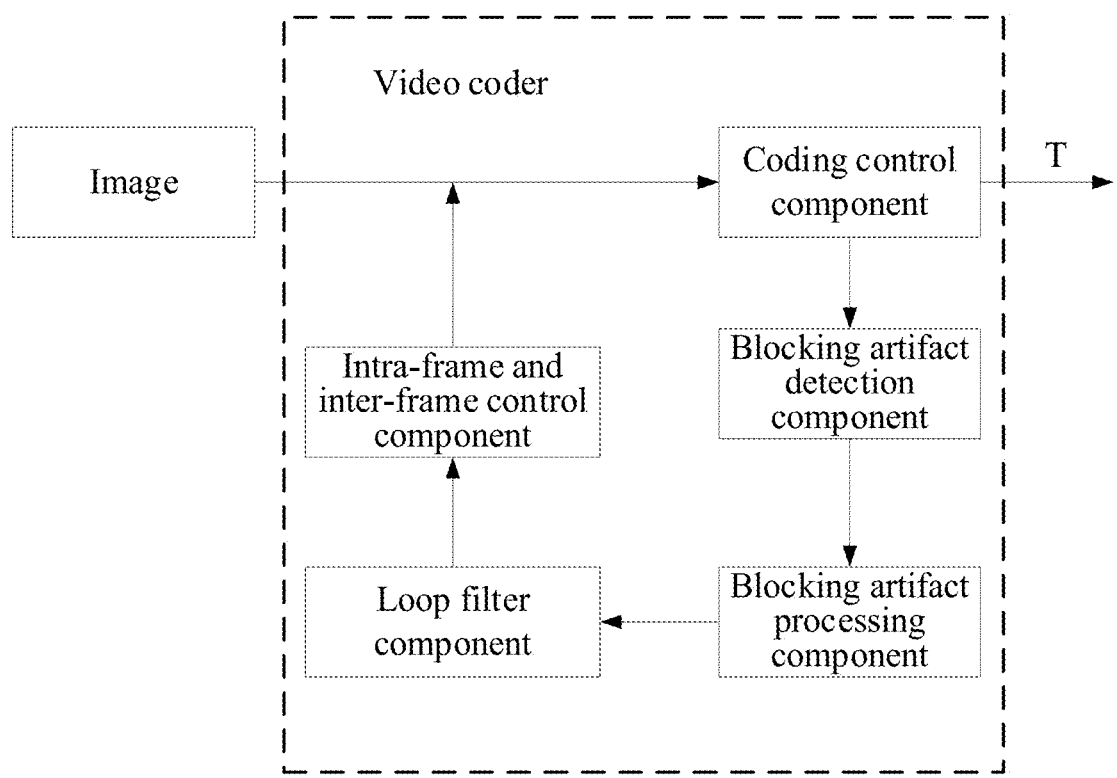
FIG. 5 is a schematic diagram of a structure of another embodiment of the video encoder according to the present disclosure.

FIG. 5 shows a video encoder configured to receive an image, encode the image, and generate a bit stream T.

As shown in FIG. 5, in this embodiment, the above blocking artifact processing component is a component for implementing the above blocking artifact processing method. Operations, features, and resulting beneficial effects described above for the blocking artifact processing method are also applicable to the blocking artifact processing component, and details are not repeated herein.

According to the video encoder provided in this embodiment, the use of the blocking artifact processing component makes it possible to more accurately find the coding unit in which there is a blocking artifact and the coding tree unit that needs to be recoded, and to recode the coding tree unit or the original image corresponding to the coding tree unit in a timely manner, which can eliminate the blocking artifact in real time. Compared with entire-frame or entire-row recoding by the loop filter component, recoding the current coding tree unit or the original image corresponding to the current coding tree unit reduces the cost of recoding, and the adverse impact of the blocking artifact, thereby comprehensively improving the subjective quality of coding.

Figure 6:
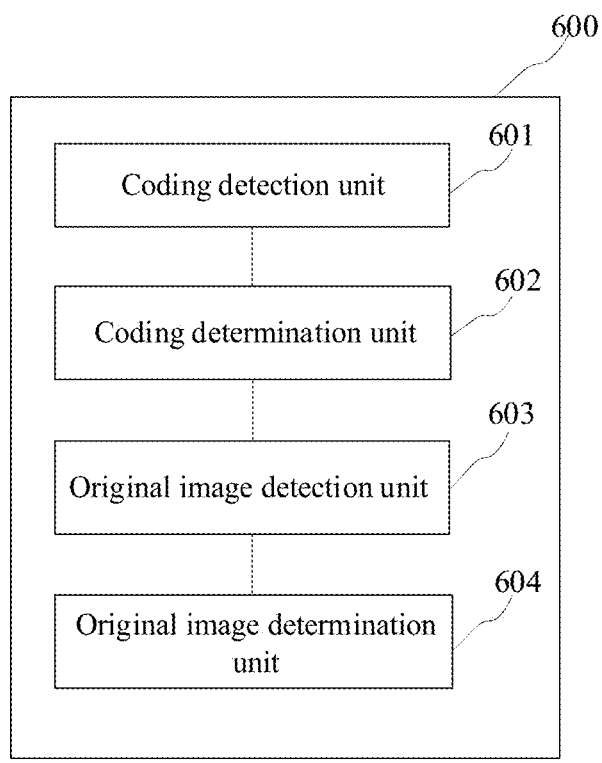
FIG. 6 is a schematic diagram of a structure of an embodiment of a blocking artifact detection apparatus according to the present disclosure.

Further with reference to FIG. 6, as an implementation of the above methods shown in the figures, the present disclosure provides an embodiment of a blocking artifact detection apparatus. The apparatus embodiment corresponds to the method embodiment shown in FIG. 1. The apparatus may be specifically applied in a variety of electronic devices.

As shown in FIG. 6, a blocking artifact detection apparatus 600 provided in this embodiment includes: a coding detection unit 601, a coding determination unit 602, an original image detection unit 603, and an original image determination unit 604. The coding detection unit 601 may be configured to detect, based on a sum of pixel differences between each coding unit in a current coding tree unit and an adjacent coding unit, whether the coding unit and the adjacent coding unit meet an edge detection condition. The coding determination unit 602 may be configured to, in response to determining that the coding unit and the adjacent coding unit meet the edge detection condition, determine, based on information about the coding unit, image regions of an original image corresponding to the coding unit and the adjacent coding unit. The original image detection unit 603 may be configured to detect whether the image regions meet the edge detection condition. The original image determination unit 604 may be configured to determine, in response to determining that the image regions do not meet the edge detection condition, that there is a blocking artifact between the coding unit and the adjacent coding unit.

In this embodiment, for the specific processing and technical effects of the coding detection unit 601, the coding determination unit 602, the original image detection unit 603, and the original image determination unit 604 in the blocking artifact detection apparatus 600, reference may be made to related descriptions of step 101, step 102, step 103, and step 104 in the embodiment corresponding to FIG. 1, respectively, and details are not repeated herein.

In some optional implementations of this embodiment, the apparatus 600 further includes: a blocking artifact determination unit (not shown in the figure), which may be configured to determine, in response to determining that the coding unit and the adjacent coding unit do not meet the edge detection condition, that there is no blocking artifact between the coding unit and the adjacent coding unit.

In some optional implementations of this embodiment, the apparatus 600 further includes: a non-block determination unit (not shown in the figure), which may be configured to determine, in response to determining that the original image regions meet the edge detection condition, that there is no blocking artifact between the coding unit and the adjacent coding unit.

In some optional implementations of this embodiment, the sum of pixel differences is a sum of pixel differences in a pixel row direction, and the edge detection condition includes: the sum of pixel differences being greater than a sum of differences between adjacent rows, and the sum of pixel differences being greater than a sum of differences between internal rows, where the sum of differences between adjacent rows is a sum of pixel differences between any two adjacent rows in the pixel row direction in the adjacent coding unit or the image region corresponding to that adjacent coding unit; and the sum of differences between internal rows is a sum of pixel differences between any two adjacent rows in the pixel row direction in each coding unit or the image region corresponding to that coding unit.

In some optional implementations of this embodiment, the sum of pixel differences is a sum of pixel differences in a pixel column direction, and the edge detection condition includes: the sum of pixel differences being greater than a sum of differences between adjacent columns, and the sum of pixel differences being greater than a sum of differences between internal columns, where the sum of differences between adjacent columns is a sum of pixel differences between any two adjacent columns in the pixel column direction in the adjacent coding unit or the image region corresponding to that adjacent coding unit; and the sum of differences between internal columns is a sum of pixel differences between any two adjacent columns in the pixel column direction in each coding unit or the image region corresponding to that coding unit.

In the blocking artifact detection apparatus provided in the embodiment of the present disclosure, first, the coding detection unit 601 detects, based on the sum of pixel differences between each coding unit in the current coding tree unit and the adjacent coding unit, whether the coding unit and the adjacent coding unit meet the edge detection condition; then, in response to determining that the coding unit and the adjacent coding unit meet the edge detection condition, the coding determination unit 602 determines the image regions of an original image corresponding to the coding unit and the adjacent coding unit based on the information about the coding unit; next, the original image detection unit 603 detects whether the regions meet the edge detection condition; and finally, the original image determination unit 604 determines, in response to the image regions failing to meet the edge detection condition, that there is a blocking artifact between the coding unit and the adjacent coding unit. In this way, edge detection is performed on the coding unit in the currently reconstructed coding tree unit, to determine whether a blocking artifact is generated in the coding unit. The blocking artifact detection is implemented at a detection level of a coding unit, which improves the reliability of the blocking artifact detection. After it is detected that the coding unit and the adjacent coding unit meet the edge detection condition, it is detected whether the image regions meet the edge detection condition, to determine whether there is a blocking artifact between the coding unit and the adjacent coding unit. The image regions of the original image are used as a reference for comparison, which improves the accuracy of blocking artifact detection.

Figure 7:
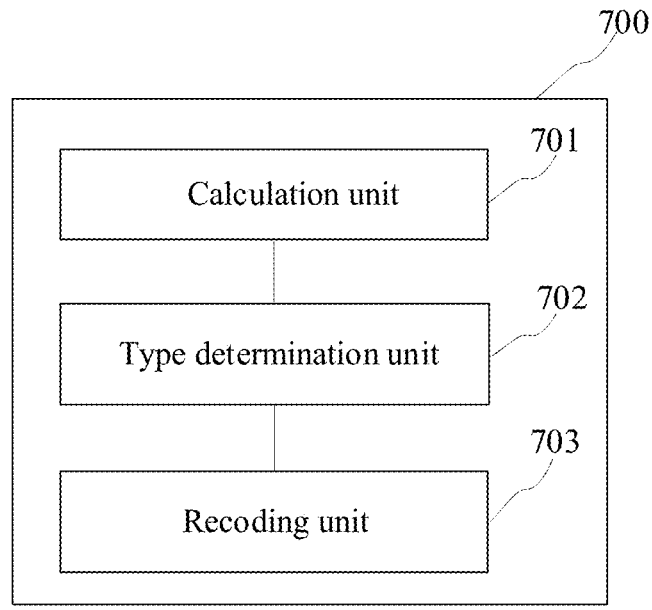
FIG. 7 is a schematic diagram of a structure of an embodiment of a blocking artifact processing apparatus according to the present disclosure.

Further with reference to FIG. 7, as an implementation of the above methods shown in the figures, the present disclosure provides an embodiment of a blocking artifact processing apparatus that is applied to a video encoder. The apparatus embodiment corresponds to the method embodiment shown in FIG. 3. The apparatus may be specifically applied in a variety of electronic devices.

As shown in FIG. 7, a blocking artifact processing apparatus 700 provided in this embodiment includes: a calculation unit 701, a type determination unit 702, and a recoding unit 703. The calculation unit 701 may be configured to calculate, in response to determining that there is a blocking artifact in a current coding tree unit, a number of coding units, in which there is a blocking artifact, in the current coding tree unit, where the coding unit in which there is a blocking artifact is detected by using the blocking artifact detection apparatus in the above embodiment. The type determination unit 702 may be configured to determine a frame type of the current coding tree unit in response to the number being greater than a number threshold. The recoding unit 703 may be configured to recode the current coding tree unit or an original image corresponding to the current coding tree unit based on the frame type.

In this embodiment, for the specific processing and technical effects of the calculation unit 701, the type determination unit 702, and the recoding unit 703 in the blocking artifact processing apparatus 700, reference may be made to related descriptions of step 301, step 302, and step 303 in the embodiment corresponding to FIG. 3, respectively, and details are not repeated herein.

In some optional implementations of this embodiment, the frame type includes: a key frame and a forward reference frame; and the recoding unit 703 is further configured to: adjust a quantization parameter of the video encoder in response to the frame type being the key frame or the forward reference frame, and recode the original image corresponding to the current coding tree unit by using the video encoder with the quantization parameter adjusted.

In some optional implementations of this embodiment, the frame type includes: a bidirectional reference frame; and the recoding unit 703 is further configured to: adjust a quantization parameter of the video encoder in response to the frame type being the bidirectional reference frame; and disable an intra-frame and inter-frame control component in the video encoder with the quantization parameter adjusted, and recode the current coding tree unit by using the video encoder.

In the blocking artifact detection apparatus provided in the embodiment of the present disclosure, first, in response to determining that there is a blocking artifact in the current coding tree unit, the calculation unit 701 calculates the number of coding units, in which there is a blocking artifact, in the current coding tree unit: then, the type determination unit 702 determines the frame type of the current coding tree unit in response to the number being greater than the number threshold; and finally, the recoding unit 703 recodes the current coding tree unit or the original image corresponding to the current coding tree unit based on the frame type. In this way, the coding unit in which there is a blocking artifact and the coding tree unit that needs to be recoded can be found more accurately, and the coding tree unit or the original image corresponding to the coding tree unit can be recoded in a timely manner, which can eliminate the blocking artifact in real time. Compared with entire-frame or entire-row recoding, recoding the current coding tree unit or the original image corresponding to the current coding tree unit reduces the cost of recoding, and the adverse impact of the blocking artifact, thereby comprehensively improving the subjective quality of coding.

In the technical solutions of the present disclosure, collection, storage, use, processing, transmission, provision, disclosure, etc. of user personal information involved all comply with related laws and regulations and are not against the public order and good morals.

According to an embodiment of the present disclosure, the present disclosure further provides an electronic device, a readable storage medium, and a computer program product.

Figure 8:
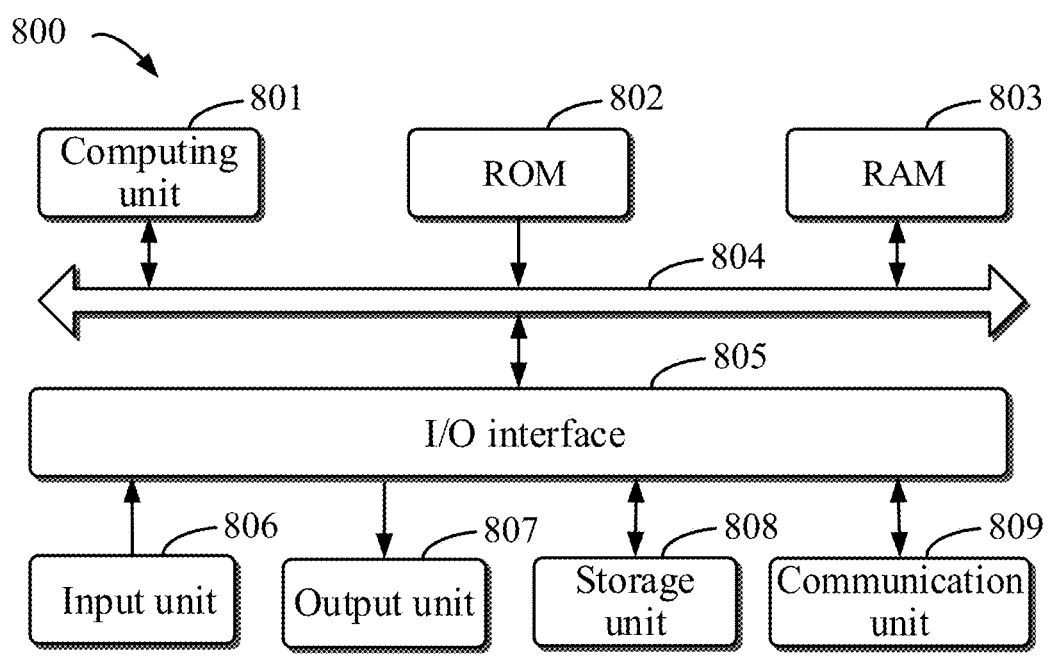
FIG. 8 is a block diagram of an electronic device for implementing a blocking artifact detection method or a blocking artifact processing method according to an embodiment of the present disclosure.

FIG. 8 is a schematic block diagram of an exemplary electronic device 800 that can be used to implement an embodiment of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown in the present specification, their connections and relationships, and their functions are merely examples, and are not intended to limit the implementation of the present disclosure described and/or required herein.

As shown in FIG. 8, the device 800 includes a computing unit 801. The computing unit may perform various appropriate actions and processing according to a computer program stored in a read-only memory (ROM) 802 or a computer program loaded from a storage unit 808 into a random access memory (RAM) 803. The RAM 803 may further store various programs and data required for the operation of the device 800. The computing unit 801, the ROM 802, and the RAM 803 are connected to each other through a bus 804. An input/output (I/O) interface 805 is also connected to the bus 804.

A plurality of components in the device 800 are connected to the I/O interface 805, including: an input unit 806, such as a keyboard or a mouse: an output unit 807, such as various types of displays or speakers: a storage unit 808, such as a magnetic disk or an optical disk; and a communication unit 809, such as a network interface card, a modem or a wireless communication transceiver. The communication unit 809 allows the device 800 to exchange information/data with other devices via a computer network such as the Internet and/or various telecommunication networks.

The computing unit 801 may be various general-purpose and/or special-purpose processing components with processing and computing capabilities. Some examples of the computing unit 801 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 801 performs the methods and processing described above, for example, the blocking artifact detection method or the blocking artifact processing method. For example, in some embodiments, the blocking artifact detection method or the blocking artifact processing method may be implemented as a computer software program, which is tangibly contained in a machine-readable medium, such as the storage unit 808. In some embodiments, a part or all of the computer program may be loaded and/or installed onto the device 800 via the ROM 802 and/or the communication unit 809. When the computer program is loaded onto the RAM 803 and executed by the computing unit 801, one or more steps of the blocking artifact detection method or the blocking artifact processing method described above can be performed. Alternatively, in other embodiments, the computing unit 801 may be configured, by any other suitable means (for example, by means of firmware), to perform the blocking artifact detection method or the blocking artifact processing method.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: implementation in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Program codes used to implement the method of the present disclosure can be written in any combination of one or more programming languages. These program codes may be provided for a processor or a controller of a general-purpose computer, a special-purpose computer, or other programmable blocking artifact detection apparatuses or blocking artifact processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and a pointing apparatus (for example, a mouse or a trackball) through which the user can provide an input to the computer. Other categories of apparatuses can also be used to provide interaction with the user. For example, feedback provided to the user can be any form of sensory feedback (for example, visual feedback, auditory feedback, or tactile feedback), and an input from the user can be received in any form (including an acoustic input, a voice input, or a tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communication network) in any form or medium. Examples of the communication network include: a local area network (LAN), a wide area network (WAN), and the Internet.

A computer system may include a client and a server. The client and the server are generally far away from each other and usually interact through a communication network. A relationship between the client and the server is generated by computer programs running on respective computers and having a client-server relationship with each other.

It should be understood that steps may be reordered, added, or deleted based on the various forms of procedures shown above. For example, the steps recorded in the present disclosure may be performed in parallel, in order, or in a different order, provided that the desired result of the technical solutions disclosed in the present disclosure can be achieved, which is not limited herein.

The specific implementations above do not constitute a limitation on the protection scope of the present disclosure. Those skilled in the art should understand that various modifications, combinations, sub-combinations, and replacements can be made based on design requirements and other factors. Any modifications, equivalent replacements, improvements, etc. within the spirit and principle of the present disclosure shall fall within the protection scope of the present disclosure.

The invention claimed is:

1. A blocking artifact detection method, applied to a video encoder, the method comprising:
   detecting, for each coding unit in a current coding tree unit, whether the coding unit and its adjacent coding unit meet an edge detection condition, based on a sum of pixel differences between each pixel pair in two adjacent rows or two adjacent columns, wherein one pixel of the pixel pair is in the coding unit and another pixel of the pixel pair is in the adjacent coding unit;
   in response to determining that a coding unit and its adjacent coding unit meet the edge detection condition, determining, based on information about the coding unit, image regions of an original image corresponding to the coding unit and the adjacent coding unit;
   detecting whether the image regions meet the edge detection condition; and determining, in response to determining that the image regions do not meet the edge detection condition, that there is a blocking artifact between the coding unit and the adjacent coding unit.

2. The method according to claim 1, further comprising: determining, in response to determining that the coding unit and its adjacent coding unit do not meet the edge detection condition, that there is no blocking artifact between the coding unit and its adjacent coding unit.

3. The method according to claim 1, further comprising: determining, in response to determining that the image regions meet the edge detection condition, that there is no blocking artifact between the coding unit and its adjacent coding unit.

4. The method according to claim 1,
wherein the sum of pixel differences is a sum of pixel differences between each of the pixel pairs in two adjacent rows, wherein one of the two adjacent rows is in the coding unit and another of the two adjacent rows is in the adjacent coding unit, and wherein the edge detection condition comprises: the sum of pixel differences being greater than a sum of differences between adjacent rows, and the sum of pixel differences being greater than a sum of differences between internal rows;
wherein the sum of differences between adjacent rows is a sum of pixel differences between any two adjacent rows in the adjacent coding unit or the image region corresponding to that adjacent coding unit; and
wherein the sum of differences between internal rows is a sum of pixel differences between any two adjacent rows in each coding unit or the image region corresponding to that coding unit.

5. The method according to claim 1,
wherein the sum of pixel differences is a sum of pixel differences between each of the pixel pairs in two adjacent columns, wherein one of the two adjacent columns is in the coding unit and another of the two adjacent columns is in the adjacent coding unit, and the edge detection condition comprises: the sum of pixel differences being greater than a sum of differences between adjacent columns, and the sum of pixel differences being greater than a sum of differences between internal columns;
wherein the sum of differences between adjacent columns is a sum of pixel differences between any two adjacent columns in the adjacent coding unit or the image region corresponding to that adjacent coding unit; and
wherein the sum of differences between internal columns is a sum of pixel differences between any two adjacent columns in each coding unit or the image region corresponding to that adjacent coding unit.

6. The method according to claim 1, further comprising:
calculating, in response to determining that there are one or more coding units with blocking artifact in the current coding tree unit, a number of coding units, in which there is a blocking artifact, in the current coding tree unit;
determining a frame type of the current coding tree unit in response to the number being greater than a number threshold; and
recoding the current coding tree unit or the original image corresponding to the current coding tree unit based on the frame type.

7. The method according to claim 6,
wherein the frame type comprises: a key frame and a forward reference frame; and
wherein the recoding the current coding tree unit or the original image corresponding to the current coding tree unit based on the frame type comprises:
adjusting a quantization parameter of the video encoder in response to the frame type being the key frame or the forward reference frame; and
recoding the original image corresponding to the current coding tree unit by using the video encoder with the quantization parameter adjusted.

8. The method according to claim 6,
wherein the frame type comprises: a bidirectional reference frame; and
wherein the recoding the current coding tree unit or the original image corresponding to the coding tree unit based on the frame type comprises:
adjusting a quantization parameter of the video encoder in response to the frame type being the bidirectional reference frame;
disabling an intra-frame and inter-frame control component in the video encoder with the quantization parameter adjusted; and
recoding the current coding tree unit by using the video encoder with the intra-frame and inter-frame control component disabled.

9. The method according to claim 1, further comprising:
performing intra-frame or inter-frame prediction on the original image, to obtain a predicted residual block corresponding to each of a plurality of coding tree units; and
for each coding tree unit of the plurality of coding tree units:
performing, a discrete cosine transform and quantization on the predicted residual block corresponding to that coding tree unit, to obtain a quantized transform coefficient;
obtaining, a reconstructed coding tree unit based on the quantized transform coefficient and the predicted residual block; and
filtering the reconstructed coding tree unit.

10. An electronic device, comprising:
at least one processor; and
a memory communicatively connected to the at least one processor, wherein the memory stores one or more programs configured to be executed by the one or more processors, the one or more programs including instructions for:
detecting, for each coding unit in a current coding tree unit, whether the coding unit and its adjacent coding unit meet an edge detection condition, based on a sum of pixel differences between each pixel pair in two adjacent rows or two adjacent columns, wherein one pixel of the pixel pair is in the coding unit and another pixel of the pixel pair is in the adjacent coding unit;
in response to determining that a coding unit and its adjacent coding unit meet the edge detection condition, determining, based on information about the coding unit, image regions of an original image corresponding to the coding unit and the adjacent coding unit;
detecting whether the image regions meet the edge detection condition; and
determining, in response to determining that the image regions do not meet the edge detection condition, that there is a blocking artifact between the coding unit and the adjacent coding unit.

11. The electronic device according to claim 10, wherein the one or more programs further comprise instructions for:

determining, in response to determining that the coding unit and its adjacent coding unit do not meet the edge detection condition, that there is no blocking artifact between the coding unit and its adjacent coding unit.

12. The electronic device according to claim 10, wherein the one or more programs further comprise instructions for:
determining, in response to determining that the image regions meet the edge detection condition, that there is no blocking artifact between the coding unit and its adjacent coding unit.

13. The electronic device according to claim 10,
wherein the sum of pixel differences is a sum of pixel differences between each of the pixel pairs in two adjacent rows, wherein one of the two adjacent rows is in the coding unit and another of the two adjacent rows is in the adjacent coding unit, and wherein the edge detection condition comprises: the sum of pixel differences being greater than a sum of differences between adjacent rows, and the sum of pixel differences being greater than a sum of differences between internal rows;
wherein the sum of differences between adjacent rows is a sum of pixel differences between any two adjacent rows in the adjacent coding unit or the image region corresponding to that adjacent coding unit; and
wherein the sum of differences between internal rows is a sum of pixel differences between any two adjacent rows in each coding unit or the image region corresponding to that coding unit.

14. The electronic device according to claim 10,
wherein the sum of pixel differences is a sum of pixel differences between each of the pixel pairs in two adjacent columns, wherein one of the two adjacent columns is in the coding unit and another of the two adjacent columns is in the adjacent coding unit, and the edge detection condition comprises: the sum of pixel differences being greater than a sum of differences between adjacent columns, and the sum of pixel differences being greater than a sum of differences between internal columns;
wherein the sum of differences between adjacent columns is a sum of pixel differences between any two adjacent columns in the adjacent coding unit or the image region corresponding to that adjacent coding unit; and
wherein the sum of differences between internal columns is a sum of pixel differences between any two adjacent columns in each coding unit or the region corresponding to that coding unit.

15. The electronic device according to claim 10, wherein the one or more programs further comprise instructions for:
calculating, in response to determining that there are one or more coding units with blocking artifact in the current coding tree unit, a number of coding units, in which there is a blocking artifact, in the current coding tree unit;
determining a frame type of the current coding tree unit in response to the number being greater than a number threshold; and
recoding the current coding tree unit or the original image corresponding to the current coding tree unit based on the frame type.

16. The electronic device according to claim 15,
wherein the frame type comprises: a key frame and a forward reference frame; and wherein the recoding the current coding tree unit or the original image corresponding to the current coding tree unit based on the frame type comprises:
adjusting a quantization parameter of the video encoder in response to the frame type being the key frame or the forward reference frame; and
recoding the original image corresponding to the current coding tree unit by using the video encoder with the quantization parameter adjusted.

17. The electronic device according to claim 15,
wherein the frame type comprises: a bidirectional reference frame; and
wherein the recoding the current coding tree unit or the original image corresponding to the coding tree unit based on the frame type comprises:
adjusting a quantization parameter of the video encoder in response to the frame type being the bidirectional reference frame;
disabling an intra-frame and inter-frame control component in the video encoder with the quantization parameter adjusted; and
recoding the current coding tree unit by using the video encoder with the intra-frame and inter-frame control component disabled.

18. A non-transitory computer-readable storage medium storing computer instructions that, when executed by one or more processors, are used to cause a computer to perform operations comprising:
detecting, for each coding unit in a current coding tree unit, whether the coding unit and its adjacent coding unit meet an edge detection condition, based on a sum of pixel differences between each pixel pair in two adjacent rows or two adjacent columns, wherein one pixel of the pixel pair is in the coding unit and another pixel of the pixel pair is in the adjacent coding unit;
in response to determining that a coding unit and its adjacent coding unit meet the edge detection condition, determining, based on information about the coding unit, image regions of an original image corresponding to the coding unit and the adjacent coding unit;
detecting whether the image regions meet the edge detection condition; and
determining, in response to determining that the image regions do not meet the edge detection condition, that there is a blocking artifact between the coding unit and the adjacent coding unit.

19. The non-transitory computer-readable storage medium according to claim 18, wherein the computer instructions, when executed by the one or more processors, are further used to cause the computer to perform operations comprising:
determining, in response to determining that the coding unit and its adjacent coding unit do not meet the edge detection condition, that there is no blocking artifact between the coding unit and its adjacent coding unit.

20. The non-transitory computer-readable storage medium according to claim 18, wherein the computer instructions, when executed by the one or more processors, are further used to cause the computer to perform following actions operations comprising:
determining, in response to determining that the image regions meet the edge detection condition, that there is no blocking artifact between the coding unit and its adjacent coding unit.

* * * * *